No. 740,851. Patented October 6, 1903.

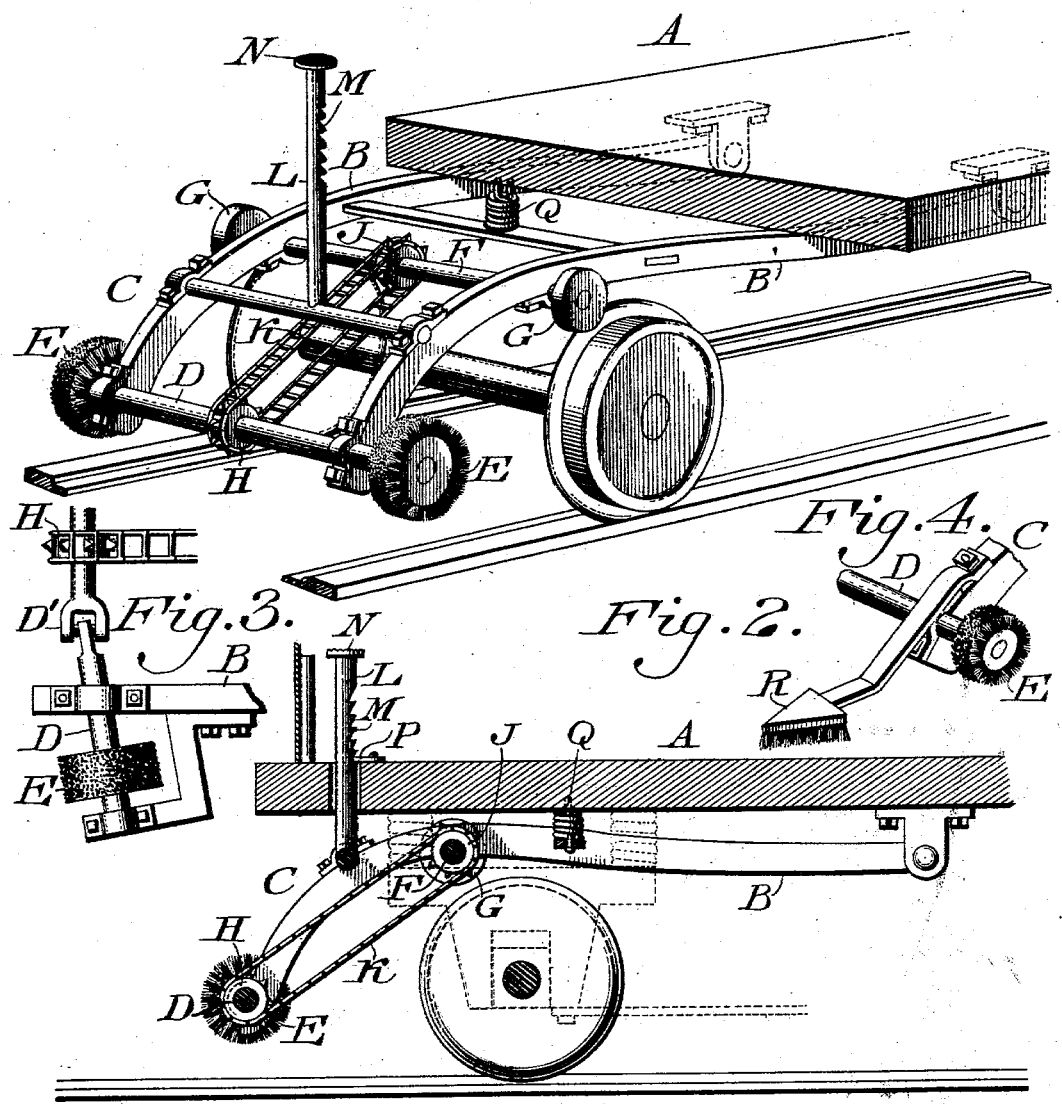

UNITED STATES PATENT OFFICE.

BENNARD HEMANN, OF BELLEVILLE, ILLINOIS.

TRACK-SWEEPER.

SPECIFICATION forming part of Letters Patent No. 740,851, dated October 6, 1903.

Application filed March 11, 1903. Serial No. 147,293. (No model.)

*To all whom it may concern:*

Be it known that I, BENNARD HEMANN, a citizen of the United States, residing at Belleville, county of St. Clair, State of Illinois, have invented new and useful Improvements in Track-Sweepers, of which the following is a specification.

My invention consists of a track-sweeper applicable to a car or other vehicle, the same embodying a brush which may receive motion from a wheel of said car or vehicle and placed upon the railroad-rails or in proximity thereto, the construction of parts being hereinafter described and the novel features being pointed out in the claims.

Figure 1 represents a perspective view of a track-sweeper embodying my invention. Fig. 2 represents a longitudinal vertical section thereof. Fig. 3 represents a top view of a detached portion, showing the brush in a different position from that in the other figures. Fig. 4 represents a perspective view of another detached portion on a reduced scale.

Similar letters of reference indicate corresponding parts in the figures.

Referring to the drawings, A designates a portion of the truck of a car or other vehicle to which my invention may be applied.

B designates arms which are hinged to any suitable member of said car, on the under side of the floor thereof or other suitable part of a truck, the same extending in the longitudinal direction of the car and having their forward ends of the form of a frame C, on which is mounted the transversely-extending rotatable shaft D, the ends whereof have the brushes E secured thereto.

F designates a counter-shaft which is mounted on the frame C rearward of the shaft D and having on its ends the friction-pulleys G.

H designates a sprocket-wheel on the shaft D, and J designates a sprocket-wheel on the shaft F. Passing around the said wheels H and J is the sprocket-chain K, whereby said wheels are geared together, and the motion of the wheel J may be communicated to the wheel H, and consequently to the brushes E, it being noticed that said brushes occupy positions in advance of the front of the car over the rails on which the same is run.

Pivotally connected with the frame C is the pusher or push-rod L, the same in the present case passing through the front platform of the vehicle and having a head N, on which the foot of the motorman or brakeman or other operator may be placed in order to depress said frame and cause the brushes E to be lowered. On said push-rod is the ratchet M and on the platform of the car about the opening through which said push-rod passes is the tooth P, which is so disposed that it may be engaged by the ratchet M, thus interlocking the push-rod and retaining the brushes in their set or operative positions.

Connected with the arms B and fixed points on the floor of the vehicle is the spring Q, the tendency of which is to elevate said arms, consequently the frame C, for purposes hereinafter stated.

The operation is as follows: When a track is to be cleared, the push-rod L is lowered, whereby the frame C descends and the pulleys G are placed in contact with the wheels of the vehicle, so that the motion of the latter is imparted to said pulleys, and consequently to the shafts F and D and wheels H and J, thus rotating the brushes E, it being noticed that the latter are close to the rails or in contact with the same, it being also noticed that the said brushes rotate in a direction the reverse of the wheels of the vehicle, whereby any dirt, snow, &c., on the rails are swept in front of said brushes, and thus the track is swept or cleaned. When service of the brushes is not required, the push-rod is released from the tooth P, whereby the frame C rises, due to the spring Q, thus removing the pulleys G from contact with the wheels of the vehicle and stopping the rotation of the brushes, which latter, as is evident, are now held in elevated position. If desired, the brushes may have their shafts set obliquely to the line of the track, so as to sweep the dirt, snow, &c., to the side of the track instead of in front of the same, as hereinbefore described.

In Fig. 3 I show the shaft D divided and the sections or members thereof connected by the knuckle-joint D', whereby the brushes on one of said sections or members may be placed obliquely over the rails instead of the right-angular position shown in the other figures. If desired, brushes R may be connected with the frame C and extend in front of the brushes E, the same being V-shaped or pointed, so as to act as primary clearers for the rails when the road is in bad condition more than ordinary, said brushes R being removable when not required.

Various changes may be made in the details of construction without departing from the general spirit of my invention, and I do not, therefore, desire to be limited in each case to the same.

Having thus described my invention, what I claim as new, and desire to secure by Letters Patent, is—

1. In a track-sweeper, a rising and falling frame mounted on a car or vehicle, shafts on said frame, means for gearing said shafts one with the other, a friction-pulley on one shaft and a brush on the other shaft, said friction-pulley being adapted to be placed in contact with a running wheel of said car by the operation of said frame.

2. In a track-sweeper, a frame pivoted to a fixed member of a car or vehicle to which the sweeper is applied, shafts on said frame, means for gearing said shafts one with the other, a friction-pulley on one of said shafts, and a brush on the other shaft and means for lowering and raising said frame and the parts connected therewith.

3. In a track-sweeper, a rotary pulley and a rotary brush, a pivotal frame carrying the axles of said pulley and brush, a push-rod connected with said frame adapted to lower the same and a spring connected with said frame for raising the same.

4. In a track-sweeper, a frame mounted on a fixed member of a car or vehicle, shafts on said frame, means for gearing said shafts one with another, a friction-pulley on one of said shafts and means for lowering and raising said frame.

5. A track-sweeper comprising a frame, means for raising and lowering said frame, a rotary brush on said frame and a non-rotary brush also mounted on said frame in advance of said rotary brush.

6. A track-sweeper comprising a vertically-movable frame, a rotary brush on said frame, and a non-rotary brush removably mounted on said frame.

BENNARD HEMANN.

Witnesses:
P. B. CHUSE, Jr.,
W. F. KIRCHER.